United States Patent Office 3,033,687
Patented May 8, 1962

3,033,687
PROCESSING COOKED COMMINUTED MEATS
Robert H. Harper and Harvey H. Trombly, Park Forest, and Howard P. Bonheimer, Chicago, Ill., assignors to Swift & Company, Chicago, Ill., a corporation of Illinois
No Drawing. Filed Feb. 27, 1959, Ser. No. 795,918
7 Claims. (Cl. 99—109)

This invention relates to improvements in the manufacture of table-ready meat items and more particularly to a rapid method for producing cured meats from comminuted meat emulsions.

The preparation of cured meat products which undergo cooking as part of the manufacture has until recently involved the use of long-established processing techniques. Formation of the comminuated meat emulsion by chopping the meat to form a dispersion in water and curing with nitrate-nitrite mixtures as well as stuffing the emulsion into a casing, smoking and finally cooking the product, represents the long-established procedure for manufacturing products of this type. While there have been some improvements in the curing procedure over the years, no major changes have been introduced prior to the recently perfected continuous method for manufacturing sausages. This process and apparatus suitable for carrying out the process are the subject matter of U.S. Patents No. 2,623,451 and No. 2,685,518 to J. J. Prohaska and also No. 2,877,118, wherein B. T. Hensgen et al. are inventors. This continuous method for manufacturing sausages provides many major advantages and improvements over older methods. Manufacturing efficiency is substantially improved. Greater uniformity of product is obtainable. Processing time is significantly reduced, and it is possible to provide a more desirable and attractive product in a shorter period of time than has been possible heretofore.

An equally important and substantial step forward in the curing procedure is provided by the recently developed curing process involving the use of extraneous oxides of nitrogen and preferably extraneously added nitric oxide gas. This development comprises the subject matter of U.S. Patent No. 2,930,703.

While each of these developments has contributed significantly in speeding up the manufacture of sausages and other cured cooked comminuted meat products and each has provided tremendous impetus in the achievement of greater uniformity of product, no significant improvement has been suggested in the cooking operation.

Cooking of cured comminuted meat emulsion products generally follows the smoking step if the product is one normally smoked. If the product is not smoked, cooking follows shaping of the product into a self-sustaining form, and although some cooking of the product may be provided in the setting up step in the continuous forming process, the major part of the cooking takes place in ovens after forming and smoking.

It is an object of this invention to provide an improved rapid method for manufacturing table-ready meat products to provide more uniform individual pieces in a shorter time than has been possible heretofore.

Another object of the invention is to provide an improved method for cooking cured comminuted meat emulsion products in a shorter period of time than has been possible heretofore while still avoiding undue shrink in the product.

Additional objects if not specifically set forth herein, will be readily apparent to those skilled in the art from the detailed description which follows.

Cooking of table-ready meats, as was mentioned previously, usually takes place after the cured meat emulsion is placed in a particular well-recognized form, as a frankfurter or bologna, or other sausage item. The objectives of the cooking step which is carried out until the internal temperature of the product reaches a certain level are threefold, namely, completion of setup, reduction of bacteria and some tenderization of meat particles. Usually the product is subjected to an elevated temperature of about 90-130° F. until the cured color develops and then the temperature of cooking is raised to 165-185° F. until the temperature at the center of the product reaches 155-160° F. During this cooking cycle, the moisture content in the cooking zone must be controlled above a certain level to avoid excessive evaporation of moisture from the product with a resultant loss of weight and desirable texture. It has been customary in the past to adjust and maintain the relative humidity in the cooking zone at about 40% relative humidity while the temperature is maintained at the 90-130° F. level and then increase the moisture content in this zone to about 80% relative humidity after the cured color has developed. Concurrently with this increase in relative humidity is an increase in temperature to 170-185° F. An alternate procedure involves completion of cooking of the product with a hot water spray at about the same temperature. Failure to observe these controls with respect to moisture content and temperature within the cooking zone results in excessive shrink and greasing out of fat on the surface of the product. Usually upwards of about 2½ hours is required to complete the cooking process.

The present process contemplates treatment of formed meat products in a heat treating zone under conditions of temperature, relative humidity, and air velocity such that a cooked product may be produced in a fraction of the time deemed necessary heretofore, and a most unexpected advantage in the process lies in minimizing product shrink. In accordance with this process, the product is placed in a heat treating zone at a high temperature and low relative humidity and held in the zone while a moving current of air or other inert gas is passed through the zone. Under these conditions, cooking time can be decreased to about 6 minutes as distinguished from the 2½ hour cooking time necessary in conventional cooking processes to attain a temperature of above about 150° F. within the product.

Heat treating temperatures found desirable in the practice of this invention are in the range of 200-700° F. Of course, in order to permit the use of temperatures at the higher end of the range which provides the shortest treatment time, the relative humidity within the heat treating zone should be below about 20% relative humidity and preferably around 0.5-1%. Actually a relative humidity below about 7% is satisfactory for the treatment of most products. If the moisture content in the heating zone is permitted to attain too high a level at a given temperature, formation of a skin on the surface of the product is inhibited and the amount of shrink is increased, since no barrier to water evaporation is provided.

EXAMPLE I

An emulsion was prepared by comminuting beef and pork with sugar, salt and spices by a standard procedure, which involves grinding the trimmings through a ⅛" plate, then chopping the beef to a fine consistency followed by adding the pork together with sugar, salt, spices and water in the form of ice, continuing with chopping to a temperature of 56° F. The emulsions so produced was vacuumized in a vacuum mixer and a solution of nitric oxide in water saturated at 5° C. was added to the comminuted meat mixture during the vacuumizing period. The resultant emulsion was employed in forming frankfurters in molds substantially in accordance with procedure disclosed in the aforementioned Hensgen et al. application. The partially setup product was placed in a cooking oven where the temperature was adjusted to 250° F. and relative humidity maintained at 1%. Under these conditions a satisfactory cured cooked product was produced in 15 minutes.

EXAMPLE II

An emulsion was prepared by the procedure of Example I, with the exception that the nitric oxide in an amount equivalent to that used in Example I was incorporated in the form of ice during the chopping procedure. The resultant emulsion was employed in forming frankfurters in molds in accordance with the procedure of the Hensgen et al. application and the partially setup product was transferred to the cooking oven wherein the temperature had been adjusted to 250° F., the relative humidity to 1%, and an air velocity of 75 feet per minute. Under these conditions a satisfactory cured product was produced in 15 minutes.

EXAMPLE III

In the case of this example, an emulsion was prepared by chopping the beef which had been ground through ⅛″ plate in a silent cutter for 6 minutes. To this was added pork trimmings ground through a ¼″ plate together with sugar, salt and spices and chopped for an additional 6 minutes maintaining temperature below 40° F. by adding ice. The temperature was then permitted to rise to 56° F. during additional chopping. The chopped product was vacuum mixed under a vacuum of 28″ and the system was then backfilled to 25″ with nitric oxide gas. The meat was mixed for 1 minute after which the vacuum line was opened and the excess gas removed by vacuumization. The resultant emulsion was employed as in the above examples, in forming frankfurters in mols substantially in accordance with the procedure of Hensgen et al. and the partially setup product was transferred to a cooking oven under the same conditions of Examples I and II and again, a satisfactory product was produced in 15 minutes.

EXAMPLE IV

In order to insure that any curing procedure satisfactory for the normal method of producing cured meat products would work satisfactorily in the accelerated process, a conventional frankfurter emulsion was prepared as in Example III, except that nitrogen dioxide gas was used instead of nitric oxide. After following the same procedure in vacuumization and mixing, the excess gas removed from the product, the resultant emulsion was employed in making frankfurters by the Hensgen et al. procedure. The product so formed was transferred to cooking oven wherein the temperature was adjusted to 250° F. and relative humidity to 1%. Under these conditions a satisfactory cured product was produced in 16 minutes. The color of the finished product was not as bright as those in Examples I through III, but was considered satisfactory. (If it is desirable to have the maximally bright color, this can be achieved by addition of .3 oz. ascorbic acid per cwt., or by holding the meat for 30 minutes prior to stuffing into the Hensgen molds.)

EXAMPLE V

A conventional frankfurter emulsion was prepared from meat, sodium nitrate and sodium nitrite curing salts and flavoring ingredients. After the emulsion was fully chopped it was divided into two samples. One was added to the vacuum mixer and mixed for the purpose of removing air which is present in the emulsion, and ascorbic acid at the level of .3 oz. cwt. was mixed into the emulsion. The second portion was vacuum mixed for the purpose of removing oxygen and no ascorbic acid was added during the mixing operation. The vacuumized emulsions were placed separately in the conventional stuffer and forced into the molds of the type disclosed in the aforementioned Hensgen et al. application and setup with high frequency electricity in approximately 10 seconds. The formed frankfurters were ejected from the molds and transferred to a heat treating zone under the conditions outlined above. After removal of the frankfurters from the processing oven the frankfurters were chilled and examined for physical appearance etc. Frankfurters produced from the emulsion containing ascorbic acid were typical of those produced in Examples I through III, perhaps with slightly lighter color, but in the case of the other sample to which no ascorbic acid was added, the color was a dull gray throughout. When some of this emulsion was held aside for a period of 60 minutes prior to stuffing into the Hensgen et al. molds and processed as before, the color was satisfactory, but somewhat dull.

EXAMPLE VI

In order to more accurately define the conditions of temperature, relative humidity and air velocity required to give satisfactory product in an air oven, an emulsion was prepared by the procedure of Example III and passed through the oven under the conditions and with the results shown in the following table.

Table I

| Treating Conditions | Samples | | | | |
|---|---|---|---|---|---|
| | 1 | 2 | 3 | 4 | 5 |
| Dry Bulb (° F.) | 225 | 300 | 275 | 325 | 300 |
| Velocity of Air (f.p.m.) | 50 | 50 | 150 | 150 | 300 |
| Relative Humidity (percent) | 0.75 | 1.0 | 0.75 | 0.50 | 2.0 |
| Cooking Time in Minutes | 22 | 6 | 8 | 5 | 6 |
| Shrinkage (percent) | 8.3 | 5.0 | 6.8 | 5.8 | 6.1 |
| Finished Temperature (° F.) | 162 | 162 | 162 | 164 | 161 |

All products produced from the above five samples were of high and unusually uniform quality. It will be noted that as the lower limit of temperature range is approached, as is the case with Sample 1, a substantially longer cooking time will be required with a somewhat higher shrink resulting. Nevertheless, even this 22 minute treatment time is substantially less than treatment times now commonly employed in cooking frankfurters.

EXAMPLE VII

In this example the objective was to vary temperature while holding relative humidity and air velocity constant. The emulsion was prepared as in the previous example and treated under conditions and with the results shown in the following table.

Table II

| | 1 | 2 | 3 | 4 | 5 | 6 | 7 |
|---|---|---|---|---|---|---|---|
| Temperature (° F.) | 200 | 225 | 275 | 300 | 400 | 500 | 700 |
| Relative Humidity (percent) | 0.75 | 0.75 | 0.75 | 0.75 | 0.75 | 0.75 | 0.75 |
| Air Velocity (f.p.m.) | 150 | 150 | 150 | 150 | 150 | 150 | 150 |
| Final Internal Temperature (° F.) | 161 | 158 | 162 | 164 | 160 | 161 | 160 |
| Shrinkage (percent) | 9.9 | 8.4 | 6.8 | 7.8 | 6.2 | 5.6 | 4.9 |
| Processing Time (minutes) | 65 | 20 | 8 | 6+ | 5.9 | 5.0 | 4.9 |

EXAMPLE VIII

In this example the objective was to vary relative humidity while holding temperature and air velocity constant. The emulsion was prepared as in the previous example and treated under conditions and with the results shown in the following table.

Table III

| | 1 | 2 | 3 | 4 | 5 |
|---|---|---|---|---|---|
| Temperature (° F.) | 300 | 300 | 300 | 300 | 300 |
| Relative Humidity (percent) | 0.75 | 2.0 | 3.0 | 5.0 | 10.0 |
| Air Velocity (f.p.m.) | 150 | 150 | 150 | 150 | 150 |
| Final Internal Temp. (° F.) | 164 | 160 | 161 | 158 | 146 |
| Shrink (percent) | 7.7 | 5.6 | 8.0 | 14 | 20 |
| Processing Time (minutes) | 6+ | 6+ | 10 | 15 | 30 |

EXAMPLE IX

In this example the air velocity was varied while holding relative humidity and temperature constant. The emulsion was prepared as in the previous example and treated under conditions and with the results shown in the following table.

*Table IV*

|  | 1 | 2 | 3 | 4 |
|---|---|---|---|---|
| Temperature (° F.) | 300 | 300 | 300 | 300 |
| Relative Humidity (percent) | 2.0 | 2.0 | 2.0 | 2.0 |
| Air Velocity (f.p.m.) | 50 | 150 | 300 | 750 |
| Final Internal Temp. (° F.) | 161 | 160 | 161 | 162 |
| Shrink (percent) | 6.1 | 5.6 | 6.1 | 6.5 |
| Processing Time (minutes) | 6+ | 6+ | 6+ | 5.1 |

In summary of the Examples VI, VII, VIII and IX, it appears that time approaches a minimum for the air system at 4 to 5 minutes, shrinkage minimum may be approximately 5% with conditions having little further effect at approximately 275° F. and above, 2% relative humidity and down, 150 feet per minute and up air velocity.

EXAMPLE X

In this example an emulsion for Bologna was prepared by grinding beef materials through an ⅛" plate and pork materials through a ¼" plate. The composition of the meat mix was 40% cow meat, 15% regular plates and 45% regular pork trimmings. The beef materials were chopped in a silent cutter for 6 minutes, following which time the pork materials together with the sugar, salt, spices and water in the form of ice were added and the chopping continued until the temperature of the meat emulsion was 56° F. The meat was transferred to a vacuum mixer where the meat was vacuumized and treated with nitric oxide as in Example III above. The vacuumized and cured meat emulsion was stuffed into a standard 4" Bologna casing and transferred to the oven wherein the conditions were 292° F., 1% relative humidity and 150 feet per minute air velocity. After 45 minutes had elapsed the internal temperature of the product had reached 115° F. and the product was set up. The casing was stripped from the product, following which the Bologna was put back into the oven using the same conditions as aforementioned and a final internal temperature of 160° F. was reached in an additional 60 minutes. The color, texture and flavor of the finished product was typical of standard Bologna.

EXAMPLE XI

This example was aimed at determining whether loaves containing condiments could be manufactured satisfactorily by this process. For this purpose, pickle and pimento, olive and cheese, olive and pimento, macaroni and cheese loaves were made by using the standard formulation for such items except that curing salts were left out. These products were vacuumized and cured as the Bologna of Example X, and handled in a similar manner. The flavor, texture and color of the finished products were satisfactory.

EXAMPLE XII

A formed pork sausage product was prepared and the comminuted emulsion was chilled to about 28° F. prior to placing in a stuffer. From the stuffer the mix was passed to a mold unit and set up electronically and finally transferred to the heating zone for rapid processing. Air was passed through the heating zone at 100 feet per minute velocity and the temperature of the heating zone was maintained at 252° F. dry bulb. The finished temperature of the product was 167° F. and this temperature was obtained in 10.5 minutes with an overall shrinkage of about 23%. The shrinkage in conventional operations would have amounted to 35%. Thus there has been realized in this case a reduction in shrinkage, an improvement in color, and a smoother surface texture of the product.

EXAMPLE XIII

Smokey sausages prepared from the conventional mix employed in producing this product were set up electronically in the continuous sausage producing apparatus and the set up pieces were then conveyed to the heating zone. The heating zone was held at an operating temperature of 300° F. dry bulb and a relative humidity of 1% while an air stream of 100 f.p.m. was passed through the zone. A final internal temperature in the product of 155° F. was attained in about 7 minutes and a shrinkage of 10% resulted.

EXAMPLE XIV

This example was planned to show the advantage of preparing dry sausage involving this rapid cooking procedure. Pepperoni was made from a typical meat formula consisting of cow meat, regular beef trimmings and special lean pork trimmings, wherein the beef material was ground through an ⅛" plate, the pork material through a ¾" plate. The ground meat was placed in a mixer wherein the meat mixture was mixed with salt, sugar and flavoring material. While maintained under a vacuum, curing was carried out as under Example III, using nitric oxide. The meat mix was stuffed into hog casings graded 36 to 44 millimeters in diameter and links of 12" were made. The links were passed through the oven, again with conditions of Example III, except that the oven was filled with a heavy smoke. The product was passed through the oven at the same rate as franks in Example III, but due to the larger diameter the internal temperature was only 130° F. Following the completion of this operation, the product was removed to a dry room wherein satisfactory shrink was attained in the minimum length of time required for holding such product.

It is readily apparent that while the improved heat treating process disclosed and claimed herein can be employed either alone or in combination with conventional curing and forming methods and provides significant improvements in the products formed, the improvement both in rapidity of manufacture and uniformity of product is understandably much greater when the instant method is combined with the gas curing and electronic setting up techniques.

Further, it can be readily appreciated that while the method has been illustrated in the processing of frankfurters and other sausage products, the benefits to be realized are obtainable and the method is applicable to any table-ready item or comminuted meat product which is formed, cooked and/or cured prior to use. Table-ready items include all of those meat products which are generally marketed in a form ready for use without further processing. This includes Bologna, olive and pimento loaf, pickle and pimento loaf, as well as precooked sausage and other specific types of sausage formed from a comminuted meat emulsion.

While this invention is described herein largely from the standpoint of low relative humidities and high temperatures in a variable velocity of air or other inert gas, it is apparent that most of the work of the examples is directed to the production of the maximum benefits, namely, production of highly uniform high quality product in a minimum time. Nevertheless, some reduction in time can be effected with humidities as high as about 20%. Under these conditions the temperature should be about 210° F. and the finished product would be obtained in about 25 minutes. The color is somewhat inferior but acceptable especially if artificial color is to be used.

Obviously many modifications and variations of the invention as hereinbefore set forth may be made without departing from the spirit and scope thereof and, therefore, only such limitations should be imposed as are indicated in the appended claims.

We claim:

1. A rapid method for processing a cured meat product comprising forming an emulsion of comminuted meat and water, contacting said meat with a source of nitric oxide to cure said meat, forming the cured meat emulsion into the desired shape, setting said formed meat emulsion to produce a self-sustaining product and subjecting said product to an elevated temperature in a zone maintained from about 200° F. to about 700° F. at a relative humidity below about 20%, while passing gas through said zone, for a period of time sufficient for said emulsion to attain a temperature of above about 130° F.

2. A rapid method for cooking formed, uncooked sausage products while inhibiting the loss of moisture from said products comprising the steps of introducing said formed products into a heat treating zone, adjusting the relative humidity within said zone to a relative humidity below about 20%, elevating the temperature of said zone from about 200° F. to about 700° F., holding said product within said zone while passing fluid through said zone and removing said product from said zone after a period of residence therein sufficient to provide an attainment temperature within said product of above about 150° F.

3. A rapid process for preparing table-ready meat products from meat emulsions containing meat, curing salts, and spices, comprising setting up said emulsion in a mold to form a product of the desired shape, subjecting said shaped product to an elevated temperature or from about 200° F. to about 700° F., maintaining the moisture content of the atmosphere within which said product is heated below about 20% relative humidity, to minimize the evaporation of water from said product, while continuously passing said atmosphere over said product for a period of at least about 5 minutes, and cooling said product whereby to provide a cooked, cured sausage.

4. A rapid method of cooking formed, uncooked sausage product while inhibiting the loss of moisture from said product, comprising the steps of introducing said formed, uncooked products into a heat treating zone, adjusting the moisture content of said zone to a relative humidity of from 0.5–7%, elevating the temperature of said zone in the range of about 200–700° F., and passing air through said zone at a velocity of 50–750 feet per minute, holding said formed product in said zone until an internal temperature within said product of at least 150° F. is attained, and removing said product from said zone.

5. A rapid method for the production of cured, comminuted meats comprising contacting an emulsion of comminuted meat with extraneous oxides of nitrogen to effect cure, forming said cured, comminuted meat into a desired shape, and at least partially setting up said shape to provide a self-sustaining form, and heating said partially set up product at a temperature of about 200–700° F. under conditions of relative humidity below about 20% for a time sufficient to provide an attainment temperature within said product above about 150° F.

6. A rapid method for processing a sausage product comprising curing a comminuted meat emulsion with extraneous nitric oxide, setting said emulsion in a desired shape by electrically heating substantially uniformly all portions of said emulsion to at least partially coagulate the protein and cooking said product in a heating zone maintained at a temperature of about 200–700° F. and a relative humidity below about 20% for a time sufficient to provide an attainment temperature within said product above about 150° F.

7. A rapid method of treating cured comminuted meat products to complete setup, reduce bacteria, and provide tenderization of said meat product in a short period of time and avoid a substantial amount of shrink comprising: subjecting said product to an elevated temperature above about 200° F. in a zone wherein the relative humidity is maintained at a level below about 20% whereby to prevent formation of a skin on the surface of the product and permit the attainment of a temperature at the center of the product of at least 150° F. in a short period of time.

References Cited in the file of this patent

UNITED STATES PATENTS

| | | |
|---|---|---|
| 2,308,601 | Gentele | Jan. 19, 1943 |
| 2,331,266 | Cramer | Oct. 5, 1943 |
| 2,685,518 | Prohaska | Aug. 3, 1954 |

FOREIGN PATENTS

| | | |
|---|---|---|
| 560,806 | Canada | July 22, 1958 |